United States Patent [19]

Sato et al.

[11] Patent Number: 4,698,626

[45] Date of Patent: Oct. 6, 1987

[54] COORDINATE-DATA INPUT DEVICE FOR CRT DISPLAY HAVING CURSOR TRAVEL CONTROL MEANS

[75] Inventors: Yoshitsugu Sato, Kuwana; Satoshi Furukawa, Suzuka, both of Japan

[73] Assignee: Brother Kogyo Kabushiki Kaisha, Aichi, Japan

[21] Appl. No.: 739,040

[22] Filed: May 29, 1985

[30] Foreign Application Priority Data

Jun. 2, 1984 [JP] Japan .................... 59-113634

[51] Int. Cl.$^4$ ............................. G09G 1/00
[52] U.S. Cl. .................... 340/710; 340/706; 340/709; 178/18
[58] Field of Search .......... 340/706, 709, 710; 273/148 B; 178/18

[56] References Cited

U.S. PATENT DOCUMENTS

| | | | |
|---|---|---|---|
| 4,122,438 | 10/1978 | Bird | 178/18 |
| 4,364,035 | 12/1982 | Kirsch | 340/710 |
| 4,369,439 | 1/1983 | Broos | 340/710 |
| 4,552,360 | 11/1985 | Bromley et al. | 273/148 B |
| 4,580,006 | 4/1986 | Hull | 178/18 |

FOREIGN PATENT DOCUMENTS 0036843 2/1984 Japan ........................ 340/709

OTHER PUBLICATIONS

IBM Technical Disclosure Bulletin, "Mouse/Keyboard Concept Incorporating Unique Devices for Controlling CRT Display Cursors" vol. 27, No. 10B Mar. 1985.
Electronic Fun with Computers & Games, by Ken Uston pp. 28–103 Nov. 1983.

Primary Examiner—Gerald L. Brigance
Assistant Examiner—Jeffery A. Brier
Attorney, Agent, or Firm—Parkhurst & Oliff

[57] ABSTRACT

An apparatus for entering coordinate data for moving a cursor on a screen of a CRT display in response to movements of a manually movable unit on a planar board, comprising a detecting device disposed on the manually movable unit to detect amounts of movement of the manually movable unit in X- and Y-axis directions on the planar board, a magnification selector for selecting one of plural values of magnification of the detected amounts of movement of the movable unit, and a data processor for obtaining distances of movements of the cursor on the display screen, by multiplying the detected amounts of movement of the movable unit by the selected value of magnification.

12 Claims, 4 Drawing Figures

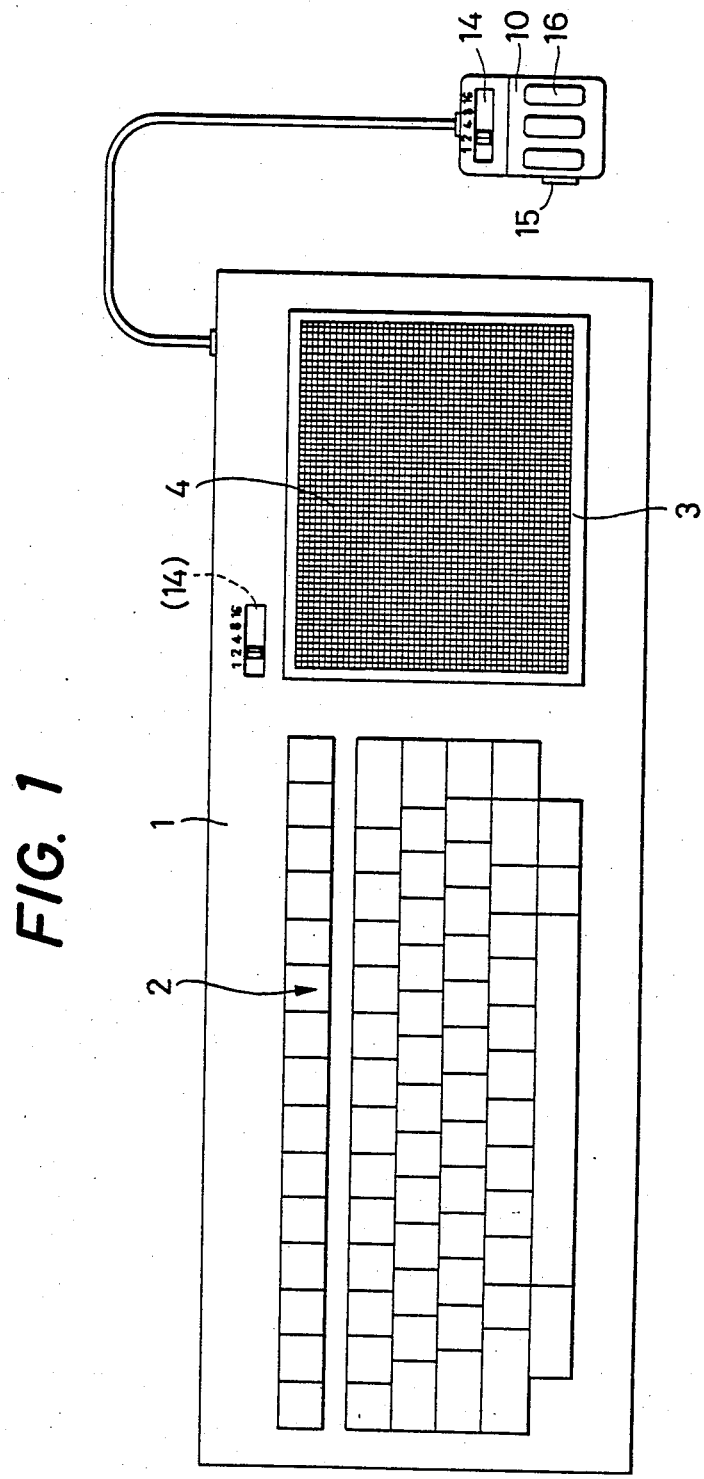

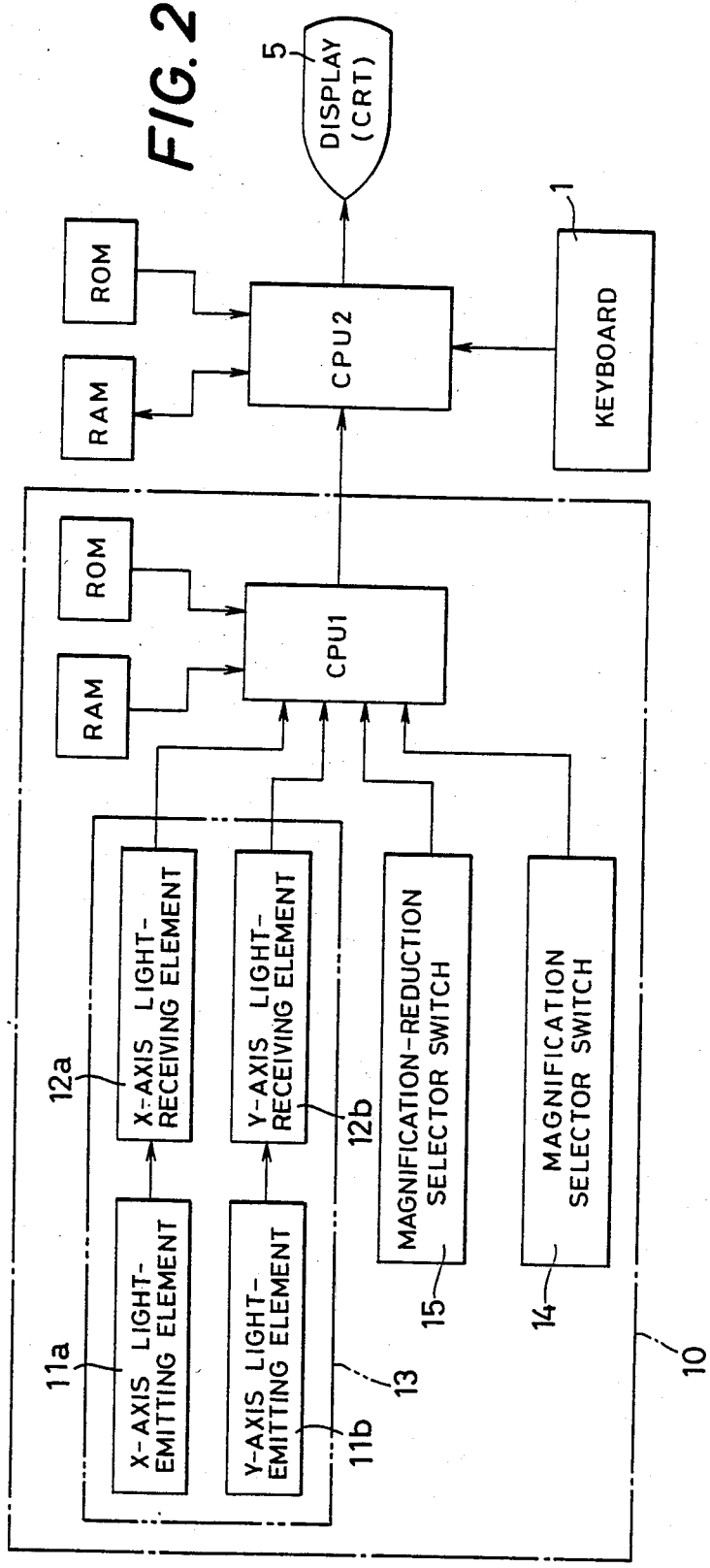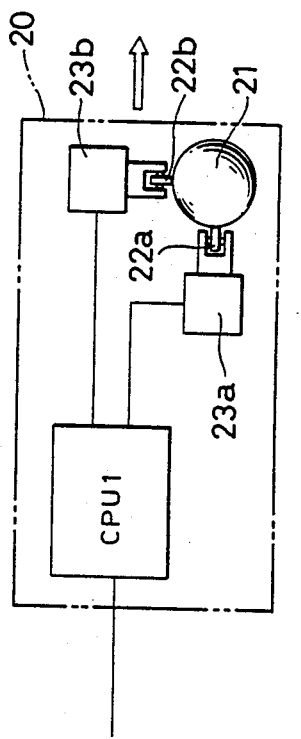

COORDINATE-DATA INPUT DEVICE FOR CRT DISPLAY HAVING CURSOR TRAVEL CONTROL MEANS

BACKGROUND OF THE INVENTION

1. Field of the Art

The present invention relates to a device for entering coordinate data for moving a cursor on the screen of a cathode-ray tube display for microcomputers, word processing instruments, and other data processing equipment.

2. Related Art Statement

In the art of moving a cursor in an X-Y coordinate system on the screen of a cathode-ray tube display or video terminal (hereinafter referred to as "CRT display"), there have been known cursor keys or buttons which are disposed on a data input keyboard. The cursor on the display screen is moved right and left along the X axis by X-axis cursor keys, and back and forth or up and down along the Y axis by Y-axis cursor keys. When it is desired to move the cursor from a first point on the screen to a second point whose X and Y coordinates are both different from the corresponding X and Y coordinates of the first point, the appropriate X-axis cursor key should be operated before the appropriate Y-axis cursor key is operated, or vice versa, so that the cursor is moved first along one axis and then along the other axis. In either case, movements of the cursor on the display screen along both X and Y axes require cumbersome operations of the cursor keys on the keyboard.

To free the operator from such cumbersome operations of the plural cursor keys, there is proposed a coordinate-data input device using a manually movable unit which is moved by the operator on a planar board, so that the cursor is moved on the CRT display screen, following paths of movements of the manually movable unit on the planar board. As the manually movable unit is moved, data on the amounts and directions of the movement are entered into a central processing unit of a computer, and the cursor is moved based on the data applied to the central processing unit. Consequently, the operator may easily move the cursor to a desired position on the display screen, by moving the manually movable unit on the planar board while observing the current position of the cursor on the screen.

According to the above-introduced coordinate-data input device, however, the distances of movement of the cursor on the screen are proportional to the amounts of movements of the manually operable unit on the planar board. That is, the ratio of the cursor movement to the movement of the manually movable unit is fixed. In the case where the planar board is limited in size, the movement of the manually movable unit must be repeated two or more times when the cursor is moved by a relatively large distance. In a coordinate-data input device of optical type wherein a planar board has a lattice made up of multiple intersecting X and Y scanning lines which are optically detected during movements of a manually movable unit on the lattice so that the cusor is moved based on the optical detection of the scanning lines, the size of the planar lattice board is limited, particularly when the lattice board is disposed on a keyboard or similar data input device. The limited size of the lattice board leads to increased number of operations of the manually movable unit.

SUMMARY OF THE INVENTION

It is therefore an object of the present invention to provide a coordinate-data input device for moving a cursor on a display screen, which is substantially free from the above-indicated inconveniences encountered in the prior art.

According to the present invention, there is provided a coordinate-data input device for moving a cursor on a screen of a cathode-ray tube display in response to movements of a manually movable unit on a planar board, comprising detector means disposed on the manually movable unit, magnification selector means, and processing means. The detector means detects amounts of movement of the manually movable unit in X-axis and Y-axis directions on the planar board, and the magnification selector means selects one of plural values of magnification of the amounts of movements of the manually movable unit detected by the detector means. The processing means obtains distances of movement of the cursor on the screen of the display, by multiplying the detected amounts of movement of the manually movable unit by the selected magnification value designated by the magnification selector means.

In the coordinate-data input device constructed according to the invention as described above, the cursor on the screen of the cathode-ray tube display may be moved in a desired direction by a distance that is a multiple of the detected amount of movement of the manually movable unit, which multiple is selected from among the plural magnification values by the magnification selector means, depending upon desired amounts of movement of the cursor on the display screen, in relation to the surface area of the planar board used.

In accordance with one embodiment of the invention, the planar board has a lattice which is made up of a pattern of multiple X-axis scanning lines and multiple Y-axis scanning lines perpendicular to the X-axis scanning lines, and the detector means comprises; a first light-emitting element for emitting a first ray of light which is reflected by the X-axis scanning lines; a second light-emitting element for emitting a second ray of light which is reflected by the Y-axis scanning lines; a first light-receiving element for receiving the reflected first ray of light; and a second light-receiving element for receiving the reflected second ray of light.

According to another embodiment of the invention, the detector means comprises a rolling ball which rolls in the X-axis and Y-axis directions when the manually movable unit is moved on the planar board. The detector means further comprises a first encoder for detecting an amount of rolling of the rolling ball in the X-axis direction, and a second encoder for detecting an amount of rolling of the rolling ball in the Y-axis direction.

According to a further embodiment of the invention, the coordinate-data input device comprises a selector switch which is operable between a first position in which the distances of movement of the cursor are obtained by multiplying the detected amounts of movement by the selected value of magnification, and a second position in which the distances of movement of the cursor are obtained by dividing the detected amounts of movement by the selected value of magnification. This selector switch may be incorporated in the manually movable unit.

The magnification selector means may be provided on the manually movable unit. The processing means may be incorporated in the manually movable unit, or in a controller which controls the cathode-ray tube display.

BRIEF DESCRIPTION OF THE DRAWINGS

The foregoing and other objects, features and advantages of the present invention will become more apparent when the following description of preferred embodiments of the invention are considered in connection with the accompanying drawings, in which:

FIG. 1 is a plan view of a keyboard on which is disposed one embodiment of a coordinate-data input device of this invention including a manually movable unit;

FIG. 2 is a schematic block diagram illustrating an electricl arrangement of the coordinate-data input device in connection with the keyboard, a CRT display and other components;

FIG. 4 is a schematic plan view of another embodiment of the invention.

DETAILED DESCRIPTION OF THE INVENTION

Figure 3:
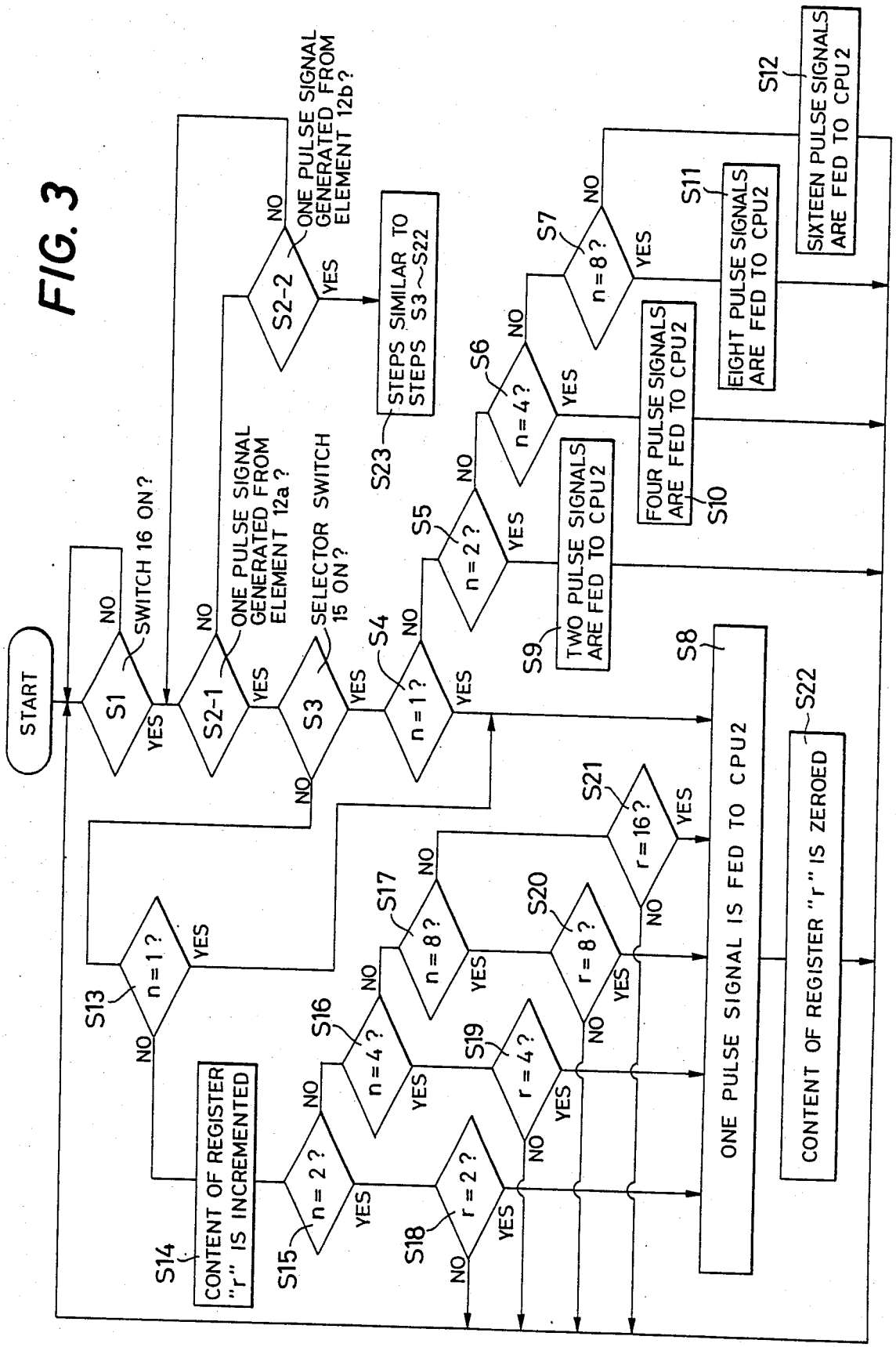
FIG. 3 is a flow chart showing the operation of the coordinate-data input device.

Referring to FIGS. 1–3, there is shown a first embodiment of a coordinate-data input device of the invention, which includes a rectangular planar X-Y lattice board 3 disposed at a right-hand side portion of a keyboard 1 which has a multiplicity of data entry keys 2. The lattice board 3 has a lattice 4 which is made up of a pattern of multiple X-axis scanning lines, and multiple Y-axis scanning lines perpendicular to the X-axis scanning lines. The X-axis scanning lines are parallel vertical lines (in FIG. 1) for detecting movements along the X axis (horizontal axis), while the Y-axis scanning lines are parallel horizontal lines (in FIG. 1) for detecting movements along the Y axis (vertical axis). The X-axis and Y-axis scanning lines are narrow strips having a width of approximately 0.25 mm, and are equally spaced from each other by a distance of 0.50 mm. For example, the X-axis scanning lines are blue-colored so that they reflect rays of light in the red visible region of wavelength, while the Y-axis scanning lines are green-colored so that they reflect infrared rays. The reflected rays of light from these X-axis and Y-axis scanning lines are sensed and discriminated from each other by detector means 13 which will be described.

Reference numeral 10 designates a manually movable unit which is moved by the operator on and along the planar lattice board 3. The manually movable unit 10 incorporates; a first or X-axis light-emitting element 11a for emitting a first ray of light in the red visible region of wavelength; a second or Y-axis light-emitting element 11b for emitting a second ray of light in the infrared region of wavelength, i.e. infrared rays; a first or X-axis light-receiving element 12a for receiving the first ray of light reflected from the X-axis scanning lines; and a second or Y-axis light-emitting element 12b for receiving the second ray of light (infrared rays) reflected from the Y-axis scanning lines. The previously indicated detector means 13 comprises the first and second light-emitting elements 11a, 11b, and the first and second light-receiving elements 12a, 12b.

As discussed later in greater detail, this manually movable unit is moved on the lattice board 3 to move a cursor on the screen of a CRT display 5. The CRT display 5 is connected to the manually movable unit 10 and to the keyboard 1 through CPU 2 as indicated in FIG. 2.

The manually movable unit 10 carries on its upper surface magnification selector means in the form of a magnification selector switch 14 of a sliding type having plural positions, e.g., "1", "2", ... "16", which correspond and represent plural values of magnification "n" (magnification number). Namely, the magnification selector swtich 14 selects one of a plurality of values of magnification "n" that determines a proportion or ratio of movements of the cursor of the CRT display 5 with respect to movements of the manually movable unit 10.

The manually movable unit 10 further carries, on its left side, a magnification/reduction selector switch 15 which is operable between its first or ON position and its second or OFF position. The selected position of this selector switch 15 also affects the proportion of movements between the manually movable unit 10 and the cursor of the CRT display 5. With selector switch 15 set in the ON position, a magnification mode is established, wherein amounts of movement of the manually movable unit 10 on the planar lattice board 3 are magnified the number of times equal to a magnification value "n" selected by the magnification selector switch 14, so that distances of movement of the cursor on the CRT display 5 are equal to the amounts of movement of the manually movable unit 10 multiplied by the selected magnification value "n". With the selector switch 15 in the OFF position, a reduction mode is established, wherein the amounts of movement of the manually movable unit 10 are reduced to the inverse number "1/n" of the selected magnification value "n", so that the distances of movement of the cursor are equal to the amounts of movement of the movable unit 10 divided by the selected magnification value "n". For example, if the magnification selector switch 14 is set at "8", the amounts of movement of the manually movable unit 10 are magnified eight times when the magnification/reduction selector switch 15 is set in the ON position, or reduced to one-eighth when the switch 15 is set in the OFF position.

As indicated in FIG. 1, the manually movable unit 10 further has a switch 16 to render operative the light-emitting and light-receiving elements 11a, 11b, 12a and 12b, and other switches which include a selector switch for specifying a baud rate.

The manually movable unit 10 incorporates processing means in the form of a CPU1 as illustrated in FIG. 2 which receives outputs of the selector switches 14 and 15 and other switches (not shown in FIG. 2) such as the switch 16, and outputs of the light-receiving elements 12a and 12b which are produced as a result of movements of the manually movable unit 10 on the planar lattice board 3. In response to these outputs, the CPU1 produces pulse signals which are applied to a central processing unit CPU2 of a computer via the keyboard 1.

To operate the coordinate-data input device constructed as described hitherto, the switch 16 on the manually movable unit 10 is initially turned on to place the detector means 13 in its operative condition. The magnification selector switch 14 is then set to select a desired magnification value "n", and the magnification/reduction switch 15 is set in the ON or OFF (first or second) position to establish the magnification mode or reduction mode, depending upon the specific operation requirements.

In this condition, the manually movable unit 10 is moved on the planar lattice board 3, in a direction which corresponds to a desired direction of movement of the cursor on the screen of the CRT display 5. This movement of the movable unit 10 by the operator is effected while the current position of the cursor and its movement on the display screen are observed by the operator. As the movable unit 10 is moved, the detector means 13 intersects the X-axis scanning lines and/or Y-axis scanning lines of the lattice 4 on the lattice board 3, whereby the rays of light emitted from the light-emitting elements 11a, 11b are reflected by the corresponding scanning lines, and are received by the respective light-receiving elements 12a, 12b. In response to the reflected light, the light-receiving elements 12a, 12b apply rectangular pulse signals to the processing means, i.e., to the CPU1.

The CPU1 is provided with a read-only memory ROM which stores a program, according to which the pulse signals from the light-receiving elements 12a, 12b are processed based on the currently selected positions of the switches 15 and 16, and on the magnification number "n" selected on the selector switch 14, so that the numbers of the pulse signals received by the CPU1 are multiplied by the selected number of times "n", or divided by the selected number "n" (multiplied by the inverse number "1/n"). Based on a result of the multiplication or division, the CPU1 applies the calculated number of pulse signals to the central CPU2, as described below.

The above-briefed processing operation of the CPU1 will be described in greater detail, referring to a flow chart of FIG. 3. For easy understanding, steps of operation are indicated in the figure by step numbers preceded by letter S.

Initially, step S1 is executed to check if the switch 16 is in the ON position. If the switch 16 is placed in the ON position, step S1 is followed by step S2-1 to check if the CPU1 has received one pulse signal from the X-axis light-receiving element 12a. If the CPU1 has not received a signal from the element 12a, the CPU1 goes to step S2-2 to check if the CPU1 has received one pulse signal from the Y-axis light-receiving element 12b. If a signal from the element 12b has not been received, the CPU1 goes back to step S2-1.

Upon reception of one pulse signal from the X-axis light-receiving element 12a in step S2-1, the CPU1 goes to step S3 to check if the magnification/reduction selector switch 15 is placed in the ON position. In the case where the switch 15 is found ON, the CPU1 goes to steps S4–S7 to check the magnification selector switch 14 for the currently selected position, that is, to find the magnification value or number "n" which is currently selected. Upon finding of the magnification number "n" in step S4, S5, S6 or S7, the CPU1 executes an appropriate step S8, S9, S10, S11 or S12 to apply to the CPU2 a pulse signal or signals whose number is equal to the selected number "n", together with a signal indicating that the pulse signal or signals are associated with movements along the X axis. Thus, each time a pulse signal has been produced from the X-axis light-receiving element 12a, one X-axis pulse signal or signals are fed to the CPU2, depending upon the currently selected magnification value or number "n".

If the selector switch 15 is found OFF, the CPU1 goes to step S13 to check whether the magnification selector switch 14 is set at "1" or not. If the switch 14 is set at "1", step S8 is implemented, namely, one pulse signal is fed to the CPU2. When the CPU1 judges that the selector switch 14 is not set at "1", step S13 is followed by step S14 wherein the content of an X-axis register "r" in the CPU1 is incremented to count the number of pulse signals which have been received from the X-axis light-receiving element 12a. Subsequently, the CPU1 goes to steps S15-S17 to find the currently selected magnification value or number "n". Upon finding of the magnification number "n" in step S15, S16 or S17, the CPU1 executes an appropriate step S18, S19, S20 or S21 to check if the content of the X-axis register "r" is equal to the selected magnification number "n". If the checking reveals that the content of the X-axis register "r" is equal to the magnification number "n", the CPU1 applies one pulse signal of X-axis to the CPU2 in step 8. If, for example, the magnification number "4" is selected, a single X-axis pulse signal is applied to the CPU2 each time the X-axis light-emitting element 12a has detected four successive X-axis scanning lines on the lattice board 3 during a movement of the manually movable unit 10 along the X axis. Thus, the number of the X-axis pulse signals which are applied to the CPU2 is reduced to one-fourth of that of the pulse signals from the light-receiving element 12a.

Each time one X-axis pulse signal is fed from the CPU1 to the CPU2, the X-axis register "r" is cleared in step S22.

The CPU2 which receives the X-axis pulse signals from the CPU1 of the manually movable unit 10, controls the CRT display 5 so that the cursor is moved along the X axis on the screen, following a path of movement of the movable unit 10, by a distance corresponding to the number of the X-axis pulse signals received by the CPU1.

In the case where the checking in step S2-2 reveals that a pulse signal has been generated from the Y-axis light-receiving element 12b, the CPU1 goes to step S23 in which steps similar to the previously described steps S3 through S22 are executed. In this case, the CPU2 receives from the CPU1 a pulse signal or signals associated with movements of the cursor along the Y axis.

In the case where the cursor is moved a relatively long distance, the magnification/reduction selector switch 15 is usually set in the ON position (for the magnification mode) so that a movement of the manually movable unit 10 will cause the cursor to be moved by a distance which is a multiple of the amount of movement of the movable unit 10, which multiple is designated by the magnification selector switch 14. As a result, the required distance of movement of the movable unit 10 to obtain a given distance of movement of the cursor is reduced while the magnification mode is selected. When it is desired to move the cursor by a relatively small distance, the selector switch 15 is set in the OFF position (for the reduction mode). In this case, a movement of the movable unit 10 will cause the cursor to be moved by a distance which is a fraction of the amount of movement of the movable unit 10, which fraction is the inverse number "1/n" of the selected magnification value "n". Accordingly, the cursor may be positioned more precisely in the reduction mode. It will be appreciated to use the magnification mode until the cursor has been moved to a point which is a short distance before a target point, and then establish the reduction mode to move the cursor exactly to the target point.

While the magnification selector switch 14 is disposed on the manually movable unit 10, this switch 14 may be disposed on the keyboard 1 as indicated in FIG. 1. Further, the magnification/reduction selector switch 15 may be replaced by a switch which renders effective or ineffective the magnification selector switch 14. In this case, no reduction mode is available.

Although the aforementioned coordinate-data input device uses the CPU1 as processing means, it is possible that the CPU2 is adapted to serve as the processing means. In this case, the CPU1 merely functions to receive outputs of the switches on the movable unit 10 such as switches 14, 15 and 16, and outputs of the light-emitting elements 12a and 12b, and the CPU2 receives output signals from the CPU1 and processes these signals according to the flow chart of FIG. 3 as discussed above, so that the movements of the cursor on the CRT display 5 are controlled by the output signals of the CPU2.

Referring next to FIG. 4, a modified embodiment of the coordinate-data input device of the invention will be described. This device uses a manually movable unit generally indicated at 20. This manually movable unit 20 is adapted to be moved by the operator on and along a planar board of suitable size, which may be a portion of a planar top board of a desk or the like. As in the preceding embodiment, the cursor appearing on the screen of the CRT display 5 is moved by moving the manually movable unit 20 on the planar board.

The manually movable unit 20 comprises a rolling ball 21 which rolls in the X-axis and Y-axis directions as the movable unit 20 is moved. The movable unit 20 carries an X-axis roller 22a and a Y-axis roller 22b which are rotatably supported in frictional rolling contact with the spherical surface of the rolling ball 21. The X-axis roller 22a is rotatable about its axis parallel to the Y axis, so as to follow the X-axis component of the rolling movements of the rolling ball 21. Similarly, the Y-axis roller 22b is rotatable about its axis parallel to the X axis, so as to follow the Y-axis component of the rolling movements of the ball 21. The rotations of these X-axis and Y-axis rollers 22a and 22b are sensed by respective X-axis and Y-axis rotary encoders 23a and 23b which are connected to processing means CPU1 incorporated in the unit 20.

The ball 21 is caused to roll when the operator moves the movable unit 20 on the planar board while observing the cursor on the CRT display 5. The X-axis and Y-axis components of the rolling actions of the ball 21 are detected by the rotary encoders 23a and 23b, respectively, based on the rotations of the corresponding rollers 22a and 22b. The rotary encoders 23a, 23b apply corresponding pulse signals to the CPU1. In the instant modified embodiment, the detector means comprises the ball 21, rollers 22a, 22b and rotary encoders 23a, 24a.

The manually movable unit 20 of this modified embodiment carries a magnification selector switch, a magnification/reduction selector switch, and other switches, similar to the switches 14, 15, 16, etc. used in the previous embodiment.

As is apparent from the foregoing description, the illustrated coordinate-data input devices make it possible to magnify an amount of movement of the manually movable unit 10 or 20 by a desired number of times specified by the magnification selector switch 14 which provides plural magnification values or numbers "n", so that a distance of movement of the cursor obtained by a movement of the movable unit 10, 20 is a multiple of the amount of movement of the movable unit, which multiple is selected by the selector switch 14. Stated differently, the cursor is moved based on the number of pulse signals applied to the CPU2, which is determined by multiplying the number of pulse signals from the detector means by the selected magnification number "n". In this arrangement, the lattice board 3 with the lattice 4 disposed on the keyboard 1 may be made relatively small. Consequently, the keyboard 1 carrying the lattice board 3 may remain relatively small-sized. In the case where the coordinate-data input device of the invention uses a part of a planar top member of a desk or similar structure, the required surface area of such structure may be kept to a minimum. Further, the illustrated coordinate-data input devices permit easy entry of coordinate data through simple movements of the manually movable unit 10, 20, and fast and accurate positioning of the cursor to desired positions on the CRT display 5.

While the present invention has been described in its preferred embodiments with a certain degree of particularly, it is to be understood that the invention is not confined to the precise disclosure contained herein, but may be otherwise embodied with various changes, modifications and improvements which may occur to those skilled in the art, in the light of the foregoing teachings, without departing from the spirit and scope of the invention defined in the appended claims.

What is claimed is:

1. A coordinate-data input device for moving a cursor on a screen of a cathode-ray tube display which is controlled by a controller, comprising:
   a planar board having a top surface;
   a manually movable unit movable on the top surface of said planar board in X-axis and Y-axis directions, said manually movable unit including detector means for detecting amounts of movement of said manually movable unit in said X-axis and Y-axis directions on said planar board;
   magnification selector means for selecting one of a plurality of values of magnification; and
   processing means electrically connected to said controller of the cathode-ray tube display, said detector means and said magnification selector means, for obtaining distances of movement of said cursor on the screen of said display, by multiplying the detected amounts of movement of the manually movable means by said one value of magnification selected by said selector means.

2. A coordinate-data input device as recited in claim 1, wherein said planar board has a lattice which is made up of a pattern of multiple intersecting X-axis and Y-axis scanning lines, said detector means comprising:
   a first light-emitting element for emitting a first ray of light which is reflected by the X-axis scanning lines;
   a second light-emitting element for emitting a second ray of light which is reflected by the Y-axis scanning lines;
   a first light-receiving element for receiving the reflected first ray of light; and
   a second light-receiving element for receiving the reflected second ray of light.

3. A coordinate-data input device as recited in claim 1, wherein said detector means comprises a rolling ball which rolls in the X-axis and Y-axis directions when said manually movable unit is moved on the planar board, further comprising a first encoder for detecting an amount of rolling of said rolling ball in the X-axis direction, and a second encoder for detecting an amount of rolling of said rolling ball in the Y-axis direction.

4. A coordiante-data input device as recited in claim 1, wherein said manually movable unit carries said magnification selector means.

5. A coordinate-data input device as recited in claim 4, wherein said manually movable unit incorporates said processing means.

6. A coordinate-data input device as recited in claim 1, wherein said processing means is incorporated in said controller for controlling said cathode-ray tube display.

7. A coordinate-date input device as recited in claim 1, wherein said planar board is provided on a keyboard which is connected to said controller of the cathode-ray tube display.

8. A coordinate-date input device as recited in claim 2, wherein said lattice of said planar board is formed on a keyboard which is connected to said controller of the cathode-ray tube display.

9. A coordinate-date input device for moving a cursor on a screen of a cathode-ray tube display which is controlled by a controller, comprising:

a planar board having a top surface;

a manually movable unit movable on the top surface of said planar board in X-axis and Y-axis directions, said manually movable unit including detector means for detecting amounts of movement of said manually movable unit in said X-axis and Y-axis directions on said planar board;

magnification selector means for selecting one of a plurality of magnification values of the input device;

a selector switch operable between a first position and a second position; and processing means electrically connected to said controller of the cathode-ray tube display, said detector means and said magnification selector means, for obtaining distances of movement of said cursor on the screen of said display, by multiplying the detected amounts of movement of the manually movable means by the selected magnification value when said selector switch is placed in said first position, and by dividing said detected amounts of movements by said selected magnification value when said selector switch is placed in said second position.

10. A coordinate-date input device as recited in claim 9, wherein said planar board is provided on a keyboard which is connected to said controller of the cathode-ray tube display.

11. A coordinate-date input device as recited in claim 9, wherein said manually movable unit incorporates said processing means.

12. A coordinate-data input device as recited in claim 9, wherein said manually movable unit carries said selector switch.

* * * * *